United States Patent [19]

Herrington et al.

[11] Patent Number: 4,808,150
[45] Date of Patent: Feb. 28, 1989

[54] OVEN-HEATED HOT WHEEL SEALING APPARATUS

[75] Inventors: Fox J. Herrington, Holcomb, N.Y.; Clyde C. Tendick, Jacksonville, Ill.

[73] Assignee: Mobil Oil Corporation, New York, N.Y.

[21] Appl. No.: 100,870

[22] Filed: Sep. 25, 1987

[51] Int. Cl.⁴ .......................... B31B 1/64; B31B 23/86
[52] U.S. Cl. ..................................... 493/394; 493/193; 493/208; 493/470; 156/582; 156/583.1
[58] Field of Search ............... 493/192, 193, 197, 206, 493/208, 394, 470, 471, 472, 473; 156/582, 583.1

[56] References Cited

U.S. PATENT DOCUMENTS

| | | | |
|---|---|---|---|
| 2,127,183 | 8/1938 | Moore | 493/208 |
| 2,897,729 | 8/1959 | Ashton et al. | 493/196 |
| 3,029,853 | 4/1962 | Piazze | 483/75 |
| 3,058,402 | 10/1962 | Kugler | 493/194 |
| 3,058,403 | 10/1962 | Kugler | 493/194 |
| 3,059,690 | 10/1962 | Nyburg | 493/208 |
| 3,218,961 | 11/1965 | Kraft et al. | 156/583.1 |
| 3,404,257 | 10/1968 | Hoff | 493/394 |
| 3,414,032 | 3/1967 | Jortikka | 150/1.7 |
| 3,586,577 | 6/1971 | Bella | 156/583.1 |
| 3,962,021 | 6/1976 | Weisfeld | 156/582 |
| 4,067,761 | 1/1978 | Shirley | 156/583.1 |
| 4,416,719 | 11/1983 | Horiuchi | 156/583.1 |
| 4,617,008 | 10/1986 | Boyd et al. | 493/248 |
| 4,624,654 | 11/1986 | Boyd et al. | 493/194 |
| 4,714,454 | 12/1987 | Herrington | 493/193 |

FOREIGN PATENT DOCUMENTS

| | | | |
|---|---|---|---|
| 2833119 | 2/1980 | Fed. Rep. of Germany | 156/583.1 |
| 1134676 | 4/1957 | France | 493/208 |
| 1125363 | 8/1968 | United Kingdom . | |

Primary Examiner—Frederick R. Schmidt
Assistant Examiner—William E. Terrell
Attorney, Agent, or Firm—Alexander J. McKillop; Charles J. Speciale

[57] ABSTRACT

An oven-heated hot wheel sealing unit for heat sealing thermoplastic film. The unit includes an oven having a heater for heating the air therein. A plurality of rotors are rotatably supported within the oven. Each of the rotors includes a wheel having a rim adapted to extend outside of the oven for engaging the thermoplastic film to be heat sealed. Each rotor has a plurality of spaced fins disposed axially thereof and parallel to the wheel. Stators are positioned within the housing and provided with structure to receive the fins on the rotors. The fins on the rotors have a plurality of vanes adapted to circulate the heated air within the oven for heating the wheels by convection. The rims of the wheels extend through openings in non-stick stripper shoes on the outsides of the oven for stripping the thermoplastic film from the wheels after heat sealing the film.

14 Claims, 6 Drawing Sheets

OVEN-HEATED HOT WHEEL SEALING APPARATUS

BACKGROUND OF THE INVENTION

This invention relates to apparatus producing machine-direction heat seals for sealing one or more hems in a moving web of thermoplastic film and more particularly to an oven-heated hot wheel sealer for use in the manufacture of draw tape plastic bags.

Bags made of thin polyethylene materials have been used in various sizes. Small bags are used in the packaging of samples and the like. Larger bags are used as shopping bags; and even larger bags are used for containing trash.

A particularly advantageous closure for such a bag includes a draw tape constructed of the same polyethylene material. U.S. Pat. No. 3,029,853—Piazzi and British Pat. No. 1,125,363—Jortikka are examples of draw tape bags. Such closures have been successfully employed in the bags.

Draw tape closures for large trash bags, and the manufacture of these draw tape bags are described in U.S. Pat. No. 4,624,654—Boyd et al and in the related applications identified below.

Forming the hem, into which the tape is inserted, is shown for example in U.S. Pat. Nos. 2,897,729—Ashton et al, 3,058,402—Kugler 3,058,403—Kugler, and 4,617,008—Boyd et al, and in the copending patent application of applicant's assignee "Hem Folder with Integral Tape Inserter for Making Draw Tape Bags,", Herrington, Ser. No. 871,238 filed June 6, 1986.

Draw tape hems have been previously made by various methods. One method is to use a Teflon-coated hot bar which opens and closes against the film in the area of the bag machine where the film starts and stops. The bar closes once during each cycle while the film is stopped. A second method is to blow a series of hot jets against the film as it travels by. Bag closures for use in the field use a pair of heated belts to produce a machine-direction seal. Other apparatus producing machine-direction heat seals are disclosed in the following related applications:

APPARATUS FOR SEALING A HEM IN A MOVING WEB OF FILM USING ANGULARLY ORIENTED HOT WHEELS, Herrington et al, Ser. No. 904,449 filed Sept. 8, 1986; APPARATUS FOR SEALING A HEM IN A MOVING WEB OF FILM, Herrington, Ser. No. 904,441, filed Sept. 8, 1986; APPARATUS FOR PRODUCING A MACHINE DIRECTION HEAT SEAL, Herrington, Ser. No. 904,444 filed Sept. 8, 1986; and APPARATUS FOR PRODUCING MACHINE-DIRECTION HEAT SEALS, Herrington, Ser. No. 904,445, filed Sept. 8, 1986.

The present invention is an improvement on the inventions disclosed in the above-identified related applications.

SUMMARY OF THE INVENTION

The present invention is directed to a heat sealing unit for heat sealing thermoplastic film and particularly to a heat sealing unit for heat sealing one or more hems in a moving web of film. The apparatus in one form thereof comprises a heat sealing unit including a housing in the form of an oven with means for heating the air therein. Rotor means is rotatably supported within the oven, the rotor means including a wheel having a rim adapted to extend outside of the oven for engaging the thermoplastic film to be heat sealed. The rotor means is provided with a plurality of spaced fins disposed axially thereof and parallel to the wheel. The fins of the rotor means have a plurality of vanes adapted to circulate the heated air within the oven for heating the wheel by convection. The oven is preferably provided with channel means adapted to receive the rim of the wheel for stabilizing the temperature of the wheel within the oven. The fins on the rotor have three helical grooves thereacross to form three vanes on each of the fins whereby each of the fins functions as a three-bladed fan in circulating the heated air within the oven. Stator means is supported within the oven having spaced fins adapted to be inserted between the spaced fins of the rotor. In a preferred form of the invention stripper shoe means are attached to the oven and having an opening through which the rim of the wheel extends, the stripper shoe means having a non-stick surface surrounding the opening therethrough.

The foregoing and other objects, features and advantages of the invention will be better understood from the following, more detailed description and appended claims.

DESCRIPTION OF A SPECIFIC EMBODIMENT

The present invention is particularly related to the manufacture of draw tape bags formed from an extruded tube of polyethylene. The tube is slit along one side to form open tops in the bag for reception of trash and the like. The tube of film is folded along the other side to form the bag bottom. The sides of the panels are heat sealed and cut from the tube in a perpendicular direction to form individual bags.

Hemmed portions of each opposing panel are folded over adjacent the tops. The draw tape bag construction as thus far described is similar to the draw tape bags disclosed in copending application Ser. No. 871,238 referred to above.

Figure 1:
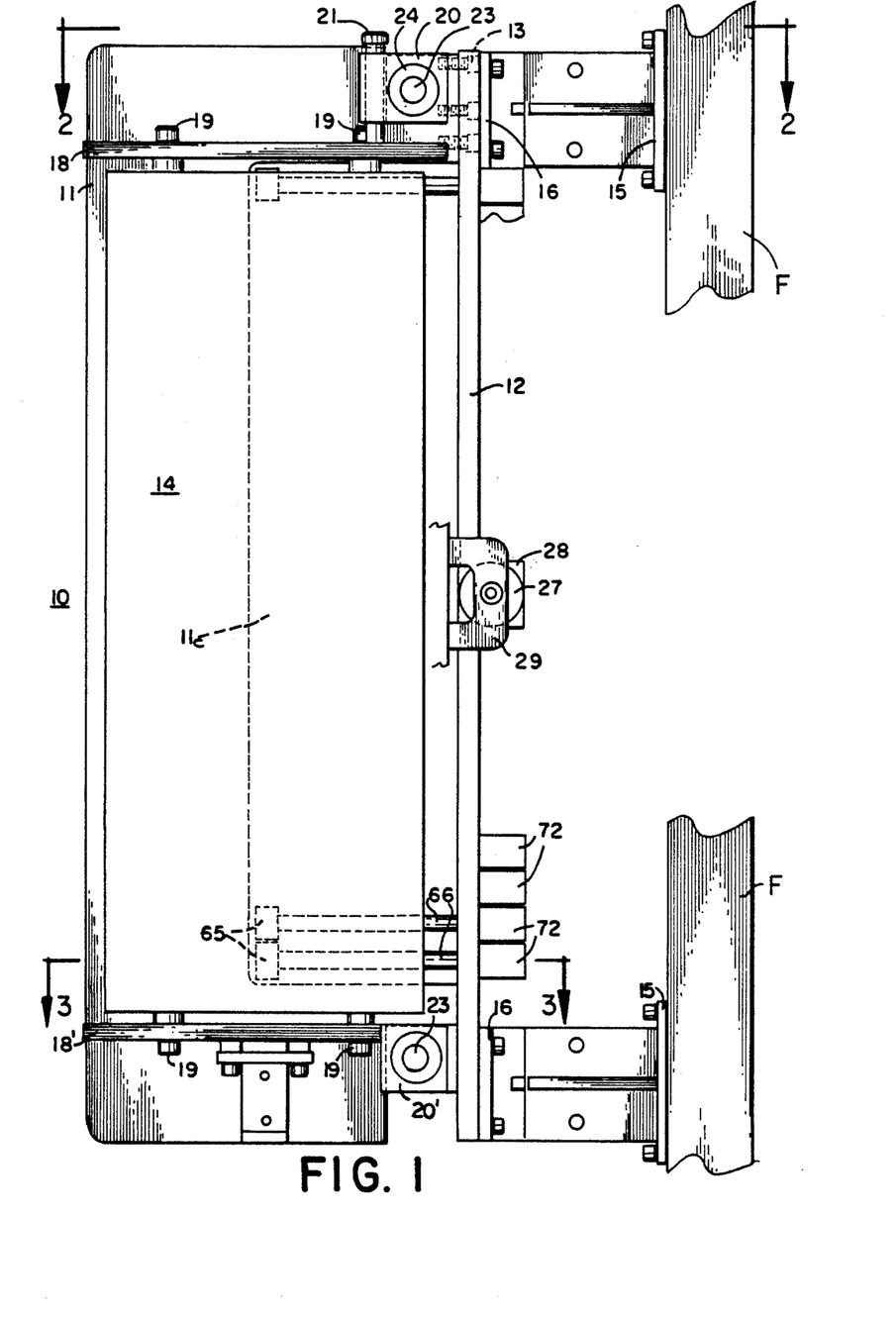
FIG. 1 is an elevation view of an oven-heated hot wheel sealing apparatus embodying the present invention.
Figure 2:
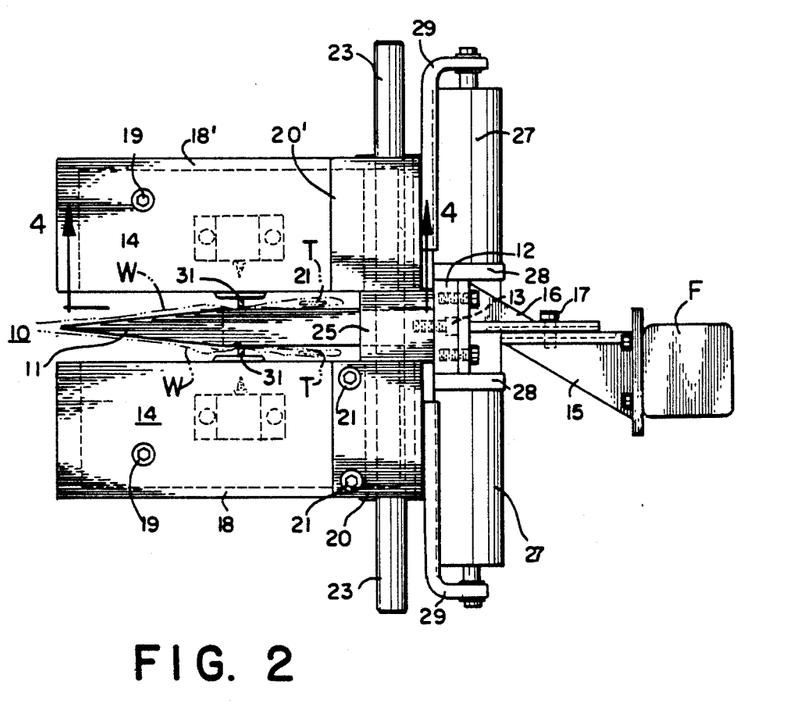
FIG. 2 is a top plan view of the oven-heated hot wheel sealing apparatus of FIG. 1 embodying the present invention.
Figure 3:
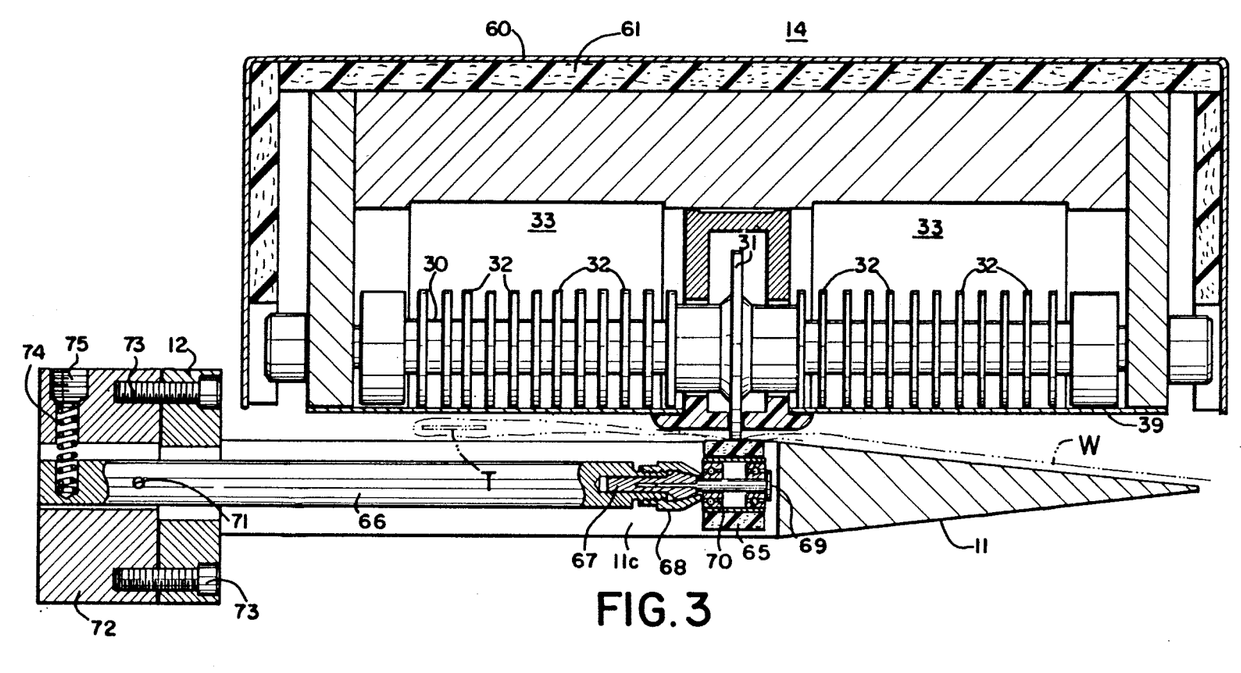
FIG. 3 is a sectional view taken along the lines 3—3 in FIG. 1.

FIGS. 1-10 illustrate an oven-heated hot wheel sealing apparatus 10 embodying the present invention for sealing a hem in a moving web of film. A moving web of film is formed from an extruded tube of polyethylene which has been slit on one side and folded on the other side to form two opposing layers of film. The slit edges are folded over to form a hem in each edge and a tape is inserted in each hem in a manner well understood in the art. The unsealed hems of the web W with the tapes T therein, in phantom lines in FIGS. 2 and 3., then move in an upward direction as shown in FIG. 1 by the arrow A over the heat sealing apparatus 10 now to be described. The apparatus 10 includes an elongated wedge 11 which projects perpendicularly from a back mounting plate 12 to which it is secured by a plurality of screws 13. An end view of the wedge shaped member 11 is shown in FIG. 2 and a cross-section of the wedge shaped member 11 is shown in FIG. 3. As may be seen in FIGS. 2 and 3 the wedge shaped member 11 has opposing surfaces over which the pair of hems in the web W pass. The folded edges of the hems are adjacent the mounting plate 12 and each of the hems contains a tape T which is to be heat sealed therein.

The heat sealing apparatus 10 is adapted to be supported in fixed position along a path of travel of the hems in the moving web W of film after the web leaves the hem folding and tape inserting portions of the bag making machine. As may be seen in FIGS. 1 and 2, the heat sealing apparatus 10 is supported from a frame member F by two pairs of brackets 15 and 16. The brackets 15 are secured to the frame member F and the brackets 16 are secured to the mounting plate 12 with the brackets 15 and 16 being secured to each other by screws 17 as shown in FIG. 2. The heat sealing apparatus 10 comprises two similar heat sealing units 14, FIGS. 1 and 2 with one unit being mounted on each side of the wedge 11. As may be seen in FIG. 1 the heat sealing unit 14 is secured between a pair of end plates 18, 18' by screws 19. A bearing block 20 is secured to one of the end plates 18 by a pair of shoulder screws 21, to allow for expansion of the unit. The other bearing block 20' is fixed to the other end plate 18'. A pair of guide rods 23, one positioned at each end of the heat sealing unit 14 extend through the ball bushings of the bearing blocks 20, 20' and are secured by a block 25 to the mounting plate 12, FIG. 2. Each of the heat sealing units 14 is adapted to be moved longitudinally of the rods 23 by the cylinders 27. The cylinders 27 are fixed to the mounting plate 12 by a cylinder mounting plate 28. The movable piston of the cylinder 27 is connected to a cylinder arm 29 which in turn is connected to the heating units 14. Thus when air is applied to the cylinders 27 the pistons are adapted to move the heating units 14 toward and away from the wedge 11. When the heat sealing units 14 are in the position illustrated in FIG. 2 they are in the heat sealing position.

Figure 4:
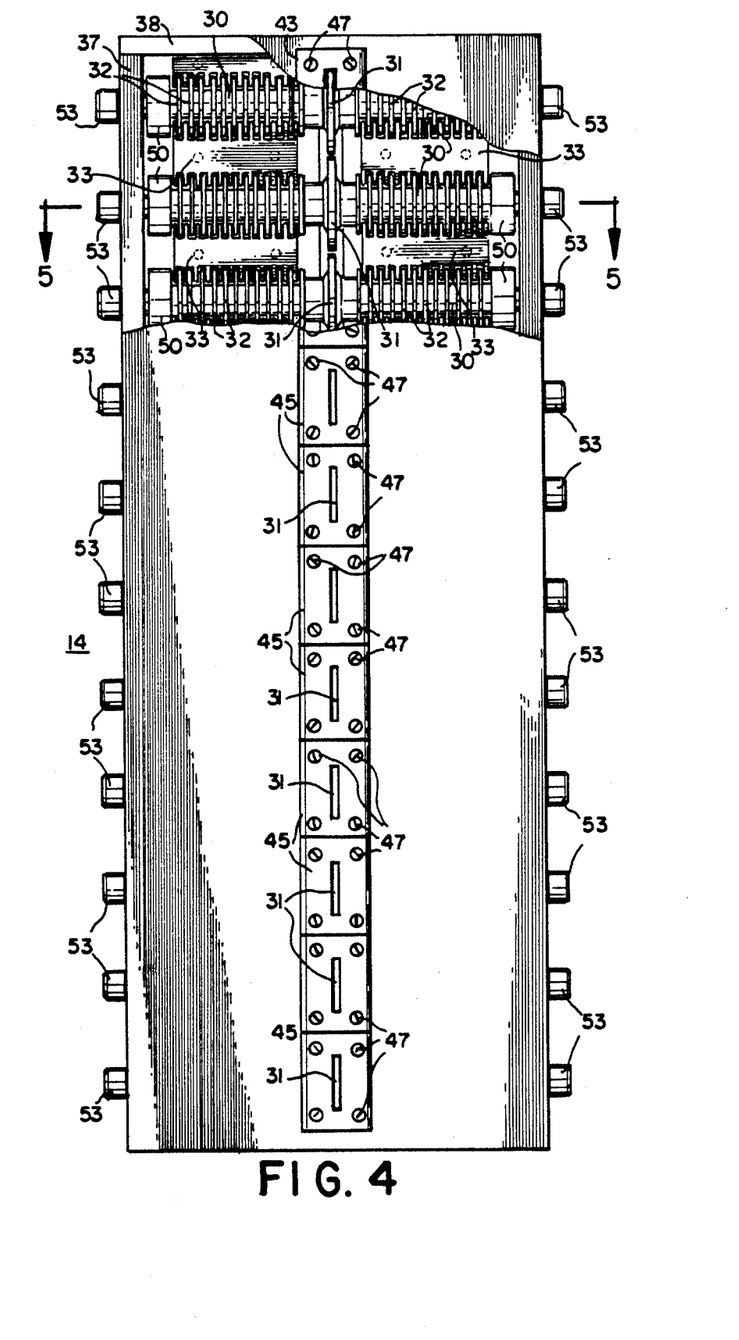
FIG. 4 is an elevation view taken along the plane of the lines 4—4 in FIG. 2 with portions broken away to show the hot wheels of the sealing apparatus.
Figure 5:
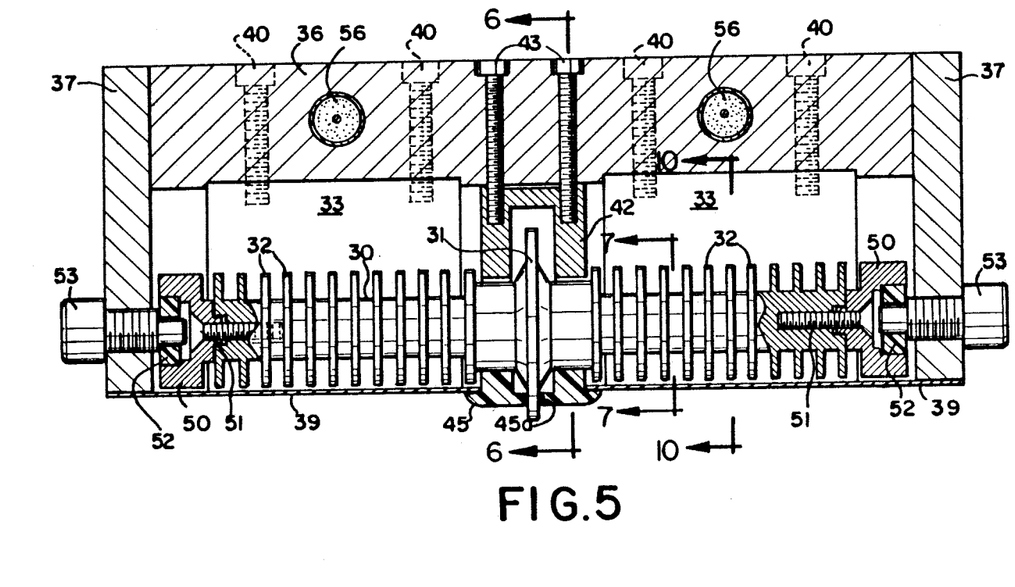
FIG. 5 is a sectional view taken along the lines 5—5 in FIG. 4.
Figure 10:
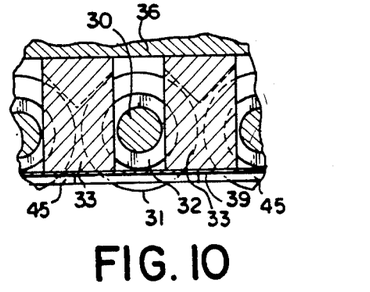
FIG. 10 is a sectional view taken along the lines 10-18 in FIG. 5 through a stator in relation to the rotor.

The details of the heat sealing units 14 are best seen in FIGS. 3–5. As may be seen in FIG. 4, each heat sealing unit 14 includes a plurality of rotors 30 having heat sealing wheels 31 intermediate their ends. Each of the rotors 30 is provided with a plurality of spaced fins 32 positioned on both sides of the wheel 31 and integral with the shaft of the rotor 30. The details of the fins 32 will later be described. The fins 32 are adapted to cooperate with the spaced fins on the slotted stators 33. The rotors 30 are rotatably mounted within a housing for cooperation with a plurality of stators 33 as shown in FIGS. 4, 5 and 10. The housing of each heat sealing unit 14 comprises a main plate 36, a pair of side plates 37, 37 and a pair of end plates 38, 38. A thin bottom plate 39 is attached to the edges of the side and end plates 37, 38 opposite the main plate 36 to form a closure for the housing. The bottom plate is provided with openings through which the wheels 31 on the rotor 30 are adapted to extend. All of the plates 36, 37, 38 and 39 are made of metal, preferably aluminum.

Figure 6:
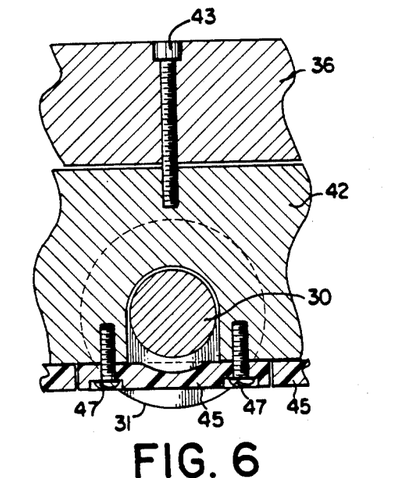
FIG. 6 is a fractional sectional view taken along the lines 6—6 in FIG. 5.
Figure 7:
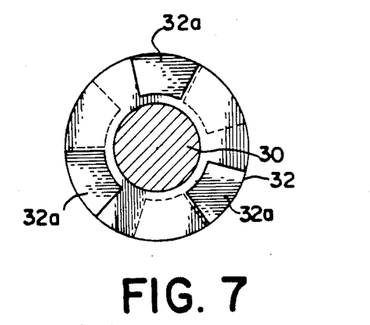
FIG. 7 is a sectional view taken along the lines 7—7 in FIG. 5 showing one of the rotor fins of the present invention.
Figure 8:
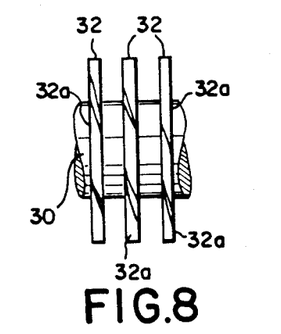
FIG. 8 is a fractional elevational view showing a portion of the rotor with three fins thereon.
Figure 9:
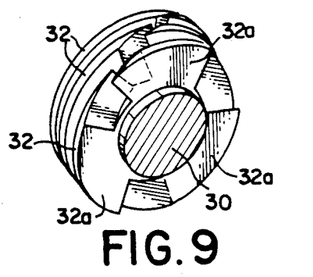
FIG. 9 is a perspective view of FIG. 8 showing the three fins that each fin on the rotor.

As may be seen in FIG. 5 the stators 33 are suspended from the main plate 36 by a plurality of screws 40. Also suspended from the main plate 36 is a U-shaped channel member 42 which extends lengthwise of the heating unit 14 and is adapted to receive the rim of the wheel 31. As shown in FIGS. 5 and 6 the U-shaped member 42 is mounted to the main plate 36 by screws 43. The U-shaped member 42 provides a support for a plurality of stripper shoes 45. Each of the stripper shoes 45 has a slot or opening 45a therein through which the rim of the wheel 31 is adapted to extend. The stripper shoes 45 are positioned within the openings in the bottom plate 39 and are secured to the U-shape support 42 by screws 47. The stripper shoes 45 are preferably made of a non-stick plastic materials, such as Teflon.

Referring to FIG. 5 it will be seen that the opposite ends of each rotor shaft 30 are provided with a bearing block 50 secured to the shaft of the rotor 30 by screws 51. Each bearing block 50 receives a bearing 52. The bearings 52 in turn receive the ends of shoulder screws 53 which extend through the sides 37 of the housing and provide the axial support for the rotors 30. Each heating unit 14 is heated by a pair of heater rods 56, 56, FIG. 5 which extend lengthwise of the main plate 36 through bores located approximately midway between the top and bottom surfaces of the main plate 36. The heater rods 56 are in good heat conducting relation with the main plate 36 and thus are adapted to heat the main plate 36 and the side and end plates 37, 38 by conduction. The heated housing comprising the main plate 36, side plates 37 end plates 38 and bottom plate 39 are contained within a heat shield assembly comprising a sheet metal cover 60 lined with thermal insulating material 61, FIG. 3.

From the foregoing description it will be seen that 1 the housing for the rotors 30 acts as a heated oven for heating the heat sealing wheels 31 on the rotors. The housing or heated oven encloses the wheels 31 except for a portion of the wheel rim which emerges from the oven to contact the passing film in which the heat seal is to be made. The rotors 30 each include a plurality of fins 32 and act as impellers when the wheels 31 are rotated by the moving film. Air circulation within the oven is maintained by the impellers attached to the wheels. As may be seen in FIGS. 7–9 each of the fins 32 has been provided with three vanes by 32a machining three helical grooves across each fin so that the three vanes 32a on each fin 32 act as a three-bladed fan.

As may be seen in FIG. 3 the heat sealing unit 14 are mounted with respect to the wedge 11 such that the rims of the wheels 31 are in alignment with a cut-out 11c on the wedge 11. Mounted within the cut-out 11c and in alignment with the plurality of wheels 31 is a corresponding plurality of rubber rollers 65 which are spring biased and are adapted to cooperate with the corresponding plurality of heated or hot wheels 31 in heat sealing one of the hems in the web. As may be seen in FIG. 3 the rollers 65 serve as backup rollers for the hot wheels 31. The backup roller 65 are mounted on shafts 66. The roller supporting end of the shaft 66 is provided with a collet 67 and a cap 68. The collet 67 is adapted to receive one end of an axle 69 on which is positioned a pair of roller bearings 70 which in turn support the backup roller 65. The shafts 66 are carried by pivots 71 which in turn are carried by backup mounting blocks 72 secured to the mounting plate 12 by screws 73. Each block 72 is provided with a spring 74 which engages the shaft 66 for the roller 65 for spring loading. The spring 74 is backed up by a set screw 75. To vary the amount of spring loading on the shaft 66 different springs may be used. While one backup roller 65 has been shown in FIG. 3 in association with its cooperating hot wheel 31 it is to be understood that each of the wheels 31 in each heat sealing unit 14 will have a cooperating backup roller 65 similar to the one illustrated in FIG. 3. For example the heat sealing unit 14 illustrated in FIG. 4 includes eleven hot wheels 31. Accordingly, eleven of the backup rollers 65 and associated parts would be used with the heat sealing unit 14 of FIG. 4. It will also be seen in FIG. 2 that two heat sealing units 14 are used in the heat sealing apparatus 10. Thus a total of twenty-two rollers 65 and associated parts will be mounted within the opening 11c in the wedge 11. In order to conserve space the backup mounting blocks 72 for each of the shafts 66 for the backup rollers 65 are staggered and offset to cooperate with the corresponding heated wheels 31 in the two heat sealing units 14 of the heat sealing apparatus 10, FIG. 1. This staggered mounting arrangement for the backup rollers is similar to arrangement disclosed in my copending application Ser. No. 904,445 referred to above.

The oven method disclosed herein of heating the hot sealing wheels 31 is frictionless so it does not require that the wheels be motor driven. In this hot oven system, the only moving part that is subject to friction in the system is the bearing at each end of the rotor 30. In my aforesaid applications Ser. Nos. 904,441 and 904,444, the heat sealing wheels are located within a housing and heated air is directed into the housing by an external blower from a plurality of external eaters and a piping system. While the wheels in that system are heated by convection such system is bulky as compared to the present heating units disclosed herein. The hot block method of heating a sealing wheel disclosed in my aforesaid applications and Ser. No. 904,445 was designed to minimize the amount of friction, however, such system is subject to durability problems associated with two surfaces rubbing against each other, namely, the hot wheel rubbing against the heated block which heats the wheel by conduction rather than heat transfer from oven air into the wheel. Heat transfer from oven air into the wheel 31 in the present invention is equal to the heat transfer coefficient times the area times the temperature difference between the air and the wheel. The heat transfer coefficient is maximized by the air circulation caused by the vanes on the rotor positioned on opposite sides of the wheel. The area is maximized by the design as disclosed herein. This results in a minimized temperature difference. If the rate of heat removal from the wheel by the film being heat sealed is reduced, such as by thinner film, then the temperature difference between the air and the wheel is likewise reduced proportionally. If this temperature difference is small to begin with, then the change will be small and the control of wheel temperature will be more precise than if the change is large. Control of the wheel temperature may be accomplished by using a thermocouple to sense the oven temperature.

It has been found that by controlling the wheel temperature in a multiple wheel heating unit to about 350° F. good heat seals can be made in 1.3 mil film at about 230 ft. per minute. By using the U-shaped channel member 42 to surround the wheels 31 the temperature of the wheels can be maintained substantially constant at the selected temperature without overheating when the bag line is stopped. It will be noted that the rotor fins 32 and the stator fins 33 are positioned outside of the enclosure 42 surrounding the wheels 31. The thermocouple for sensing the temperature is positioned within this enclosure and the air within the enclosure is about the same temperature as the wheels 31, with minimum effect by the heat source and the oven air surrounding the fins. As pointed out above the enclosure 42 also provides a support for the stripper shoes 45 which aid in stripping the heat sealed portion of the film from the wheels 31 as the film moves through the apparatus 10. By using stripper shoes made from "Teflon" or other plastic material having equivalent non-sticking characteristics the hot wheels 31 do not tend to pick up melted plastic from the film during the sealing operation.

While there has been described a preferred embodiment of the invention, it will be understood that further modifications may be made without departing from the spirit and scope of the invention as set forth in the appended claims.

What is claimed:

1. A heat sealing unit for heat sealing thermoplastic film comprising a metal housing, means, for heating the walls of said housing and the air therein, at least one rotor rotatably supported within said housing, said rotor including a wheel having a rim extending outside of said housing for engaging the thermoplastic film to be heat sealed, said rotor having a plurality of spaced fins disposed axially thereof and parallel to said wheel, and stator means positioned within said housing and having spaced grooves aligned with and receiving said fins on said rotor, said heater means being adapted to heat said housing and said stator means by conduction, said fins of said rotor having a plurality of vanes for circulating the heated air within said housing for heating said wheel by convection.

2. The apparatus of claim 1 including channel means within said housing and adapted to receive said rim of said wheel for stabilizing the temperature of said wheel within said housing.

3. The apparatus of claim 1 including stripper shoe means attached to said housing and having an opening through which said rim of said wheel extends, said stripper shoe means having a non-stick surface surrounding said opening therethrough.

4. The apparatus of claim 1 wherein said rotor comprises a plurality of rotors each including a wheel having a rim, said rotors being rotatably supported within said housing at spaced locations with said wheels in tandem for engaging the thermoplastic film to be heat sealed, each of said rotors having a plurality of spaced fins disposed axially thereof and parallel to the said wheel thereon, and each of said fins are on each said rotor having a plurality of vanes adapted to circulate the heated air within said housing for heating the respective wheels by convection.

5. Apparatus according to claim 4 including channel means within said housing and adapted to receive said wheels of said rotors for stabilizing the temperature of said wheels within said housing.

6. The apparatus of claim 5 including a plurality of stripper shoes attached to said housing and each stripper shoe having an opening through which said rim of one of said wheels extends, said stripper shoes being made of a non-stick material.

7. A heat sealing unit for heat sealing thermoplastic film comprising an oven having means for heating the air therein, at least one rotor rotatably supported within said oven, said rotor including a wheel having a rim extending outside of said oven for engaging the thermoplastic film to be heat sealed, said rotor having a plurality of spaced fins disposed axially thereof, and said fins of said rotor being constructed and arranged to circulate the heated air within said oven for heating said wheel by convection.

8. The apparatus of claim 7 including channel means within said oven and adapted to receive said rim of said wheel for stabilizing the temperature of said wheel within said oven.

9. The apparatus of claim 7 wherein said fins have a plurality of helical grooves thereacross to form a plurality of said vanes on each of said fins whereby each of said fins functions as a multiple-bladed fan in circulating the heated air within said oven.

10. The apparatus of claim 7 including stator means supported within said oven and having spaced fins adapted to be inserted between said spaced fins on said rotor.

11. The apparatus of claim 7 wherein said wheel on said rotor is positioned intermediate the ends thereof, and said fins on said rotor are positioned on both sides of said wheel.

12. The apparatus of claim 7 wherein said plurality of spaced fins on said rotor are parallel to said wheel, and said fins of said rotor have a plurality of vanes adapted to circulate the heated air within said oven for heating said wheel by convection.

13. The apparatus of claim 7 wherein said rotor comprises a plurality of rotors each including a wheel having a rim, said rotors being rotatably supported within said oven at spaced locations with said wheels in tandem for engaging the thermoplastic film to be heat sealed, each of said rotors having a plurality of spaced fins disposed axially thereof, and said fins on each rotor being constructed and arranged to circulate the heated air within said oven for heating said wheels by convection.

14. The apparatus of claim 7 wherein said fins have three helical grooves thereacross to form three of said vanes on each of said fins whereby each of said fins functions as three-bladed vanes in circulating the heated air within said oven.

* * * * *